N. PEDERSEN.
SPRING MOTOR CONTROL.
APPLICATION FILED OCT. 10, 1916.

1,301,873.

Patented Apr. 29, 1919.
3 SHEETS—SHEET 1.

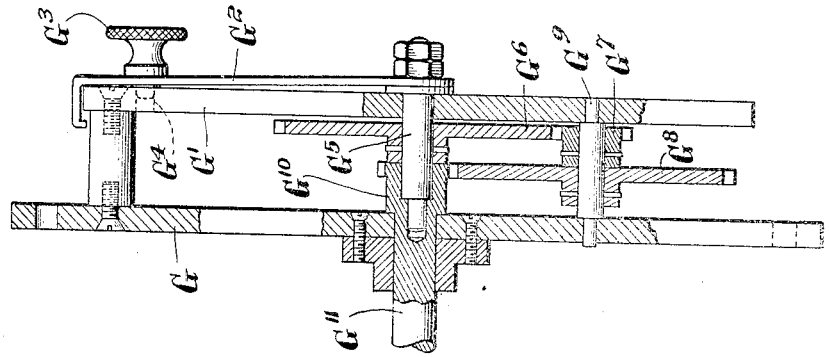
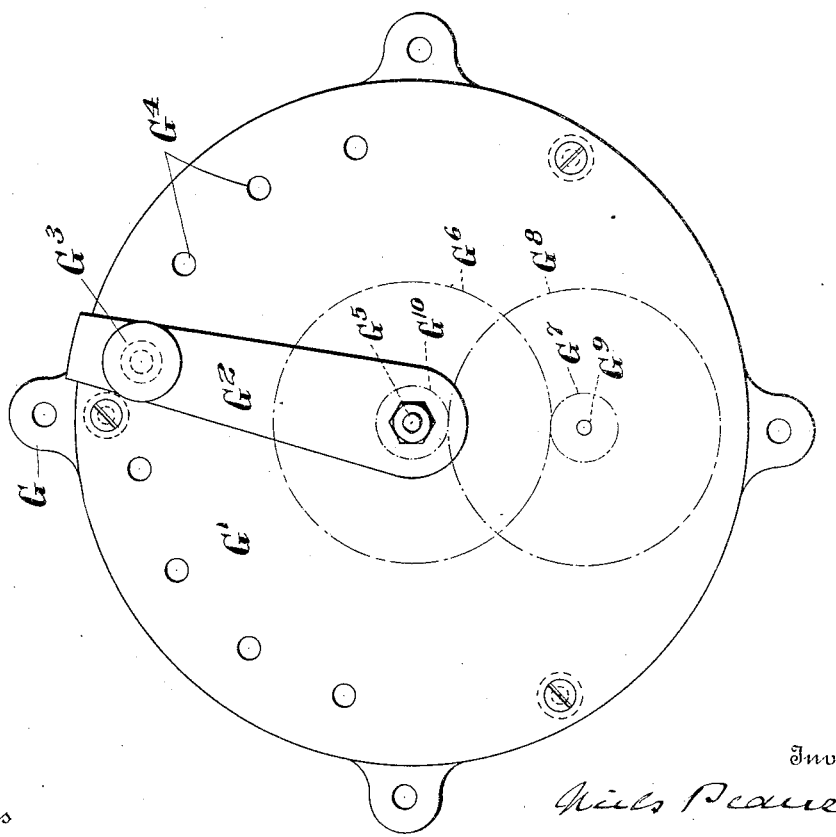

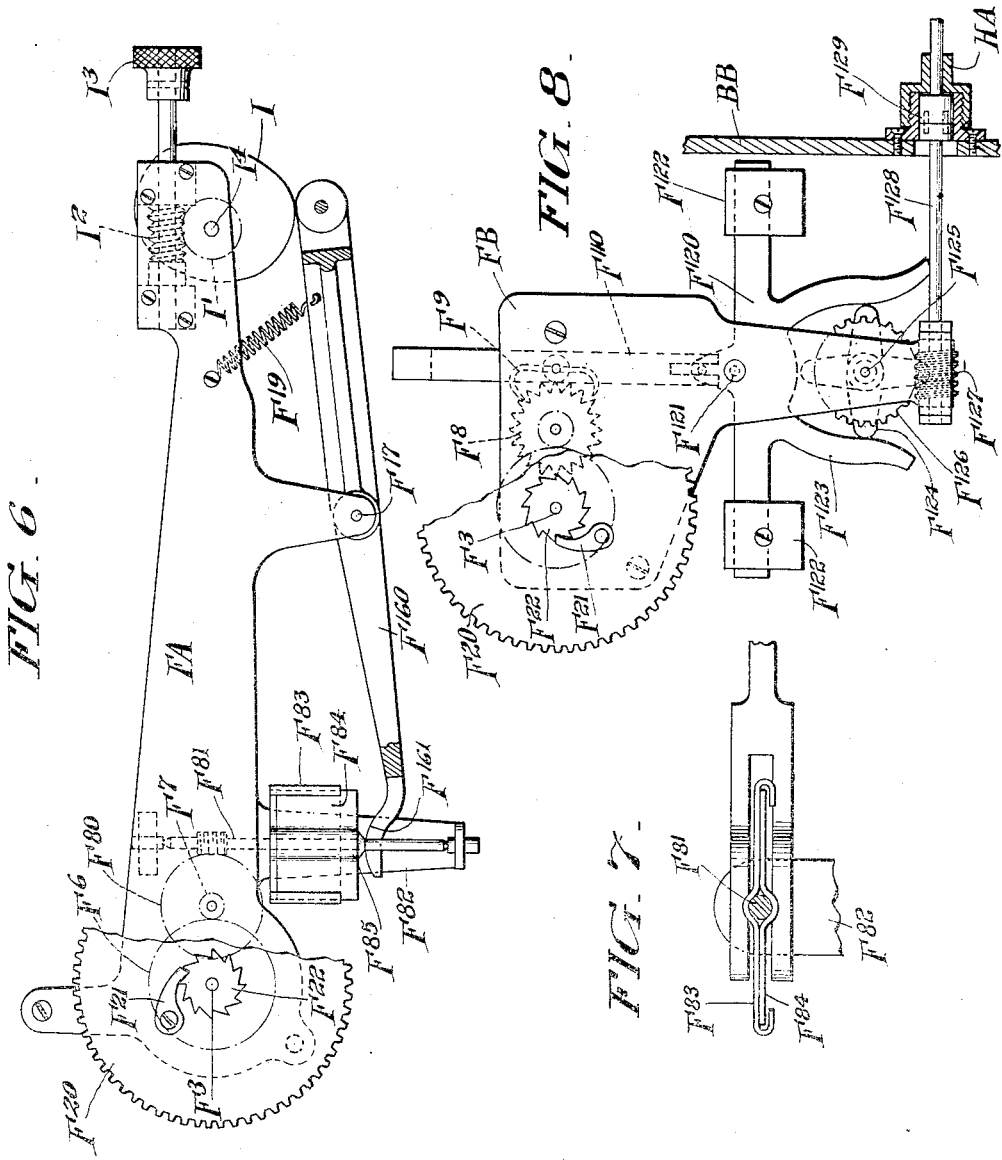

UNITED STATES PATENT OFFICE.

NIELS PEDERSEN, OF PHILADELPHIA, PENNSYLVANIA, ASSIGNOR TO ARTHUR BROCK, JR., OF PHILADELPHIA, PENNSYLVANIA.

SPRING-MOTOR CONTROL.

1,301,873.   Specification of Letters Patent.   Patented Apr. 29, 1919.

Application filed October 10, 1916.   Serial No. 124,770.

*To all whom it may concern:*

Be it known that I, NIELS PEDERSEN, a citizen of the United States of America, and a resident of the city and county of Philadelphia, in the State of Pennsylvania, have invented a certain new and useful Improvement in Spring-Motor Controls, of which the following is a true and exact description, reference being had to the accompanying drawings, which form a part thereof.

The general object of my present invention is to provide an effective combination with a spring motor actuated camera suspended from, or otherwise flexibly mounted upon an aeroplane or other air craft, of speed regulating means for the camera motor including a manually adjustable device supported independently of the camera and preferably mounted on a fixed part of the air craft.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of my invention.

Of the drawings:

Fig. 4 is an elevation of a manually adjustable controller;

Fig. 5 is a section on the line 5—5 of Fig. 4;

Fig. 6 is a view taken similarly to Fig. 3 showing a modification;

Fig. 7 is a sectional plan taken on the line 7—7 of Fig. 6 and on a larger scale; and Fig. 8 is an elevation illustrating a further modification.

Figure 1:
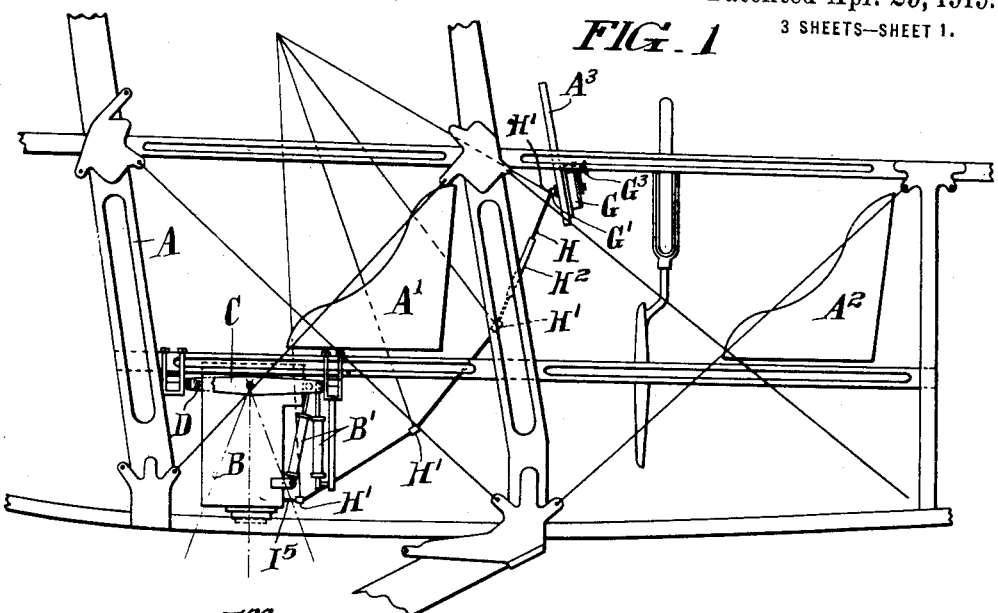
Figure 1 is an elevation of a portion of an aeroplane on which is mounted a spring motor driven camera provided with a form of my control mechanism preferred for such use.

In the drawings and referring first to the construction shown in Figs. 1 to 5 inclusive, A represents the fuselage or frame work of an aeroplane provided with a seat A′ for the driver and a seat $A^2$ for the observer. Mounted below the seat A′ is a camera B which is connected to the frame work by a universal coupling comprising gimbal frames C and D. This permits the camera to maintain to a substantial extent a fixed vertical axis notwithstanding pitching and rolling movements which the air craft may experience.

Figure 2:
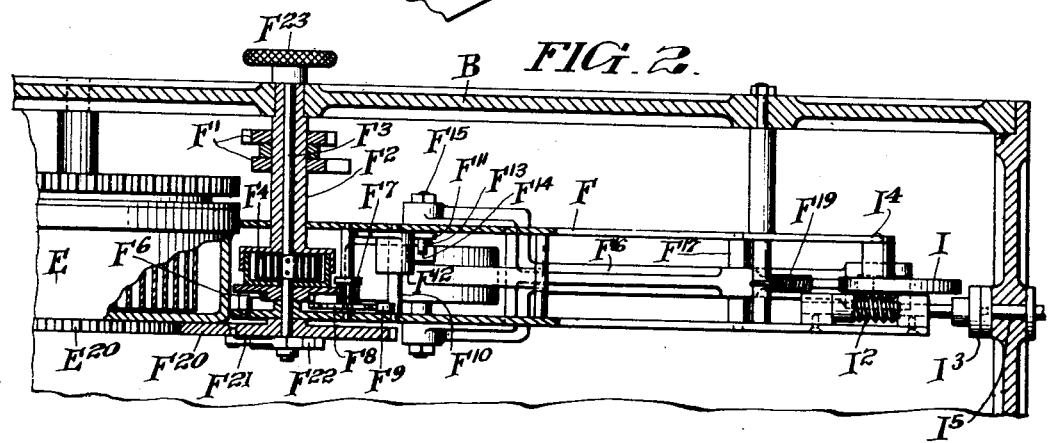
Fig. 2 is a partial sectional plan of the camera.

It is unnecessary for an understanding of the present invention to describe the camera mechanism inclosed within the camera housing further than to say that it comprises a main actuating spring motor E, a portion of which is shown in Fig. 2, and that the speed of operation of the main motor is directly controlled by a second auxiliary spring motor F or timing mechanism by means of which the cam wheels F′ mounted on the spring barrel $F^2$ of the auxiliary motor are the only parts illustrated. A camera mechanism of this type is disclosed in detail in the application, Serial No. 118,957, filed jointly by L. J. R. Holst and myself on September 8, 1916.

The timing mechanism or auxiliary motor F has its spring barrel $F^2$ journaled on the winding shaft $F^3$. The spiral driving spring $F^4$ of the auxiliary motor F has its inner end secured to the shaft $F^3$ and its outer end secured to the spring barrel $F^2$ in which the spring is inclosed. The spring barrel $F^2$ has secured to it a spur gear $F^5$ which is coaxial with the shaft $F^3$ and in mesh with a small gear $F^7$ secured to the shaft of an escapement disk or wheel $F^8$. Coöperating with the escapement wheel $F^8$ is an escapement anchor $F^9$ carried by a rock shaft $F^{10}$ to which is also secured a lever $F^{11}$ forming one of the elements of a compound pendulum. The lever element $F^{11}$ is connected at its lower end to the second element $F^{12}$ of the compound pendulum by a pin and slot connection which, as shown, comprises a pin $F^{13}$ carried by the pendulum element $F^{11}$ working in a radial slot formed in one side of the pendulum element $F^{12}$. The pendulum element $F^{12}$ comprises a body portion in the form of a disk or fly wheel, which has a supporting shaft $F^{15}$ journaled in the two forks of the bifurcated end of a lever $F^{16}$. The latter is supported by a shaft $F^{17}$ journaled in the frame work of the auxiliary motor.

In the particular construction disclosed the winding shaft $F^3$ carries a gear $F^{20}$ in mesh with the gear $E^{20}$ forming a part of the main motor E with the result that the spring $F^4$ of the auxiliary motor is normally wound up by the main motor as fast as it unwinds and thereby through the cams $F'$ permits of a corresponding movement of the main motor. The initial tension of the auxiliary motor spring $F^4$ may be adjusted by means of the external knob $F^{23}$ on the shaft $F^3$ and the pawl and ratchet connection between the shaft $F^3$ and the gear $F^{20}$ formed by the pawl $F^{21}$ secured to the gear $F^{20}$ and the ratchet wheel $F^{22}$ secured to the shaft $F^3$. The combination with a main motor of an auxiliary spring controlling motor having its driving spring kept under tension by the main motor, while novel with me forms no part of the present invention but is disclosed and claimed in my prior application, Serial No. 95,890, filed May 6, 1916.

The lever $F^{16}$ is angularly adjusted to thereby vary the frequency of vibration of the compound pendulum controlling the speed of the motor F by means of a cam I, the shaft $I^4$ of which is journaled in the frame work of the motor F. The cam I bears at its edges against a roll $F^{18}$ journaled in the adjacent end of the lever $F^{16}$. The roll $F^{18}$ is held against the periphery of the cam I by a spring $F^{19}$. Secured to the cam I and coaxial therewith is a gear wheel $I'$ in mesh with a worm $I^2$ which is journaled in the frame work of the motor F and the stem or shaft of which is connected by the coupling $I^3$ to a shaft section $I^5$ projecting through and journaled in the housing of the camera B.

The shaft $I^5$ is connected to the operating shaft $G^{11}$ of a manually actuated adjusting mechanism G mounted on the dash board in front of the observer's seat $A^2$ or on any other convenient controller stand by a flexible transmission H which, in the form shown, comprises a plurality of shaft sections, and gimbal joints $H'$ connecting the sections to one another, and connecting the ends of this flexible connection to the shaft $I^5$ and $G^{11}$ respectively. Conveniently one of the sections of the shaft H may comprise a length adjusting sleeve $H^2$ as shown.

The adjusting mechanism G comprises an operating arm $G^2$ carried by a shaft $G^3$ and sweeping over a fixed dial $G'$ which is provided adjacent its periphery with holes $G^4$ into one or another of which is inserted the stem of an operating button $G^3$ carried by the arm $G^2$ and serving, when entered in any one of the holes $G^4$, to secure the arm $G^2$ in the corresponding adjustment. The shaft $G^5$ is connected to the shaft $G^{11}$ with which it is in coaxial alinement by speed increasing gearing including a large spur gear $G^5$ carried by the shaft $G^5$, a small spur gear $G^7$ in mesh with the gear $G^6$ and secured to the countershaft $G^9$, and a large spur gear $G^8$ secured to the countershaft $G^9$ and in mesh with a small spur gear $G^{10}$ which is secured to the end of the shaft $G^{11}$.

With the particular mechanism described, one complete rotation of the arm $G^2$ serves to give the cam I one complete turn, though, as shown, less than one turn of the cam I imparts the full throw to the lever $F^{16}$. At the same time, the screw and worm connection provided between the shaft $I^5$ and the cam I prevents any possibility of the adjustment of the cam I by the pressure exerted against it by the roll $F^{18}$.

As the cam I is rotated and the pin $F^{13}$ of the pendulum element $F^{11}$ is thus moved in the slot $F^{14}$ toward and away from the center of the pendulum element $F^{12}$, the amplitude of the angular movement of the pendulum element $F^{12}$ necessary to accommodate the escapement releasing angular movement of the pendulum element $F^{11}$ increases and diminishes. The frequency of vibration of the pendulum as a whole is increased and diminished by decreasing and increasing, respectively, the amplitude of the angular movement of the pendulum element $F^{12}$. A spring $F^{30}$ carried by the frame work of the motor F is arranged to engage the periphery of the pendulum element $F^{12}$ and arrest the motion of the latter and thereby stop the motor F as the high point of the cam I is moved into engagement with the lever $F^{16}$.

The mechanism described permits of a very sensitive, accurate and reliable control of the camera mechanism without subjecting the camera housing to torques objectionably interfering with the swinging movements of the camera relative to the frame of the aeroplane necessary to the maintenance of the optical axis of the camera parallel with itself notwithstanding the pitching and rolling movements of the aeroplane. The flexible connection between the controller stand and the camera formed by the jointed shaft H does not at any time appreciably interfere with the necessary freedom of movement of the camera relative to the supporting air craft frame work.

In Figs. 6 and 7 I have illustrated an application of speed controlling mechanism to a spring motor mechanism FA which, as far as the present invention is concerned, differs from the arrangement shown in Figs. 2 and 3 only in the following respects: In the motor FA the escapement wheel $F^c$ of the motor F is replaced by a worm wheel $F^{30}$ in mesh with a worm $F^{31}$ the lower end of which rests in a step bearing carried by a bracket $F^{32}$ forming a part of the frame work of the motor FA. The shaft $F^{31}$ carries a fan blade comprising a section $F^{33}$ secured to the shaft $F^{31}$ and a section $F^{34}$ axially adjustable on the shaft $F^{81}$ and telescoping with the section $F^{83}$. The fan section $F^{84}$ comprises a hub portion $F^{85}$ which rests on the curved upper edges of the forks of a bifurcated lever $F^{160}$ which is supported and angularly adjusted just as is the lever $F^{16}$ of the construction first described, and which differs from the lever $F^{16}$ only in the shape of a portion of the lever engaging the hub portion $F^{85}$ of the fan section $F^{84}$. With the apparatus shown in Figs. 6 and 7 the effect of the angular adjustment of the lever $F^{160}$ is to increase or diminish the effective length of the fan and thereby to increase or diminish the retarding effect and thus to reduce or increase the speed of the motor FA.

Figure 3:
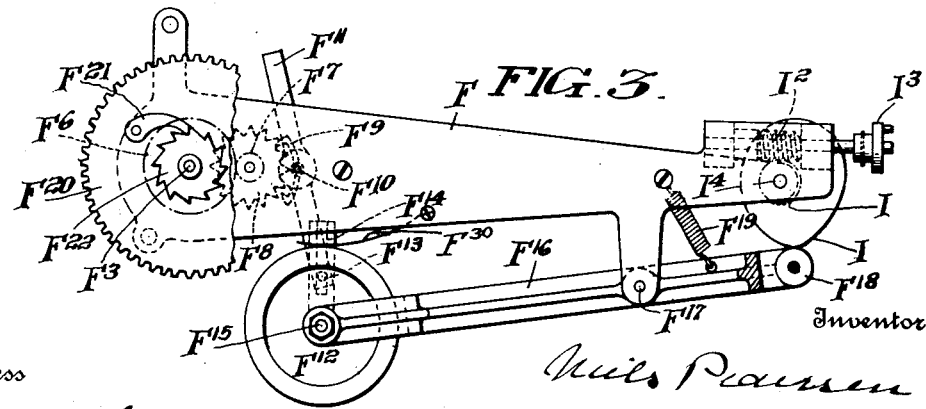
Fig. 3 is a side elevation of a portion of the apparatus shown in Fig. 2.

In the form of speed controlling mechanism illustrated in Fig. 8, the spring motor FB proper is essentially the same as the motor F shown in Figs. 2 and 3 except in the form of the compound element employed. In Fig. 8 the pendulum element $F^{110}$ secured to the escapement anchor shaft may be substantially identical with the element $F^{11}$ of Figs. 1, 2 and 3. The coöperating pendulum $F^{120}$ in this form has its supporting shaft $F^{121}$ directly journaled in the frame work of the motor FB. The pendulum element $F^{120}$ comprises diametrically opposed arms on which are mounted adjustable weights $F^{122}$, and comprises horns $F^{123}$ between which is located a device $F^{124}$ employed to directly limit the permitted range of angular movement of the pendulum element $F^{120}$. As shown, the element $F^{124}$ is carried by a shaft $F^{125}$ which also carries a worm gear $F^{126}$ in mesh with a worm $F^{127}$. The shaft $F^{128}$ carrying the worm $F^{127}$ extends through the camera housing BB or other casing inclosing the motor FB, and is connected by the coupling $F^{129}$ to some suitable adjusting mechanism by a flexible shaft HA.

In the operation of this form of my invention the shaft $F^{128}$ is adjusted to move the member $F^{124}$ between the full and dotted line positions shown. When the member $F^{124}$ is in the full line position the pendulum element $F^{120}$ is positively held against oscillation and the operation of the motor FB is thereby arrested. When the member $F^{124}$ is in the dotted line position the motion of the pendulum element $F^{120}$ is unrestrained and the motor FB operates at minimum speed. In intermediate positions of the member $F^{124}$ the throw of the pendulum element $F^{120}$ is restricted with the result that the speed of the motor FB is cut down more or less accordingly as the throw of the pendulum element $F^{120}$ is restricted less or more. Novel features of construction and arrangement of the timing mechanism disclosed, but not claimed herein, are claimed in my application, Serial Number 212,902, dated January 15, 1918, as a division of this case.

While in accordance with the provisions of the statutes I have illustrated and described the best forms of my invention now known to me, it will be apparent to those skilled in the art that changes can be made in the form of the apparatus disclosed without departing from the spirit of my invention, and that some features of my invention may sometimes be used with advantage without a corresponding use of other features.

Having now described my invention, what I claim as new and desire to secure by Letters Patent, is:—

1. The combination with an air craft, of a camera including a spring motor adjustably mounted thereon with freedom to adjust itself to compensate for pitching or rolling movements of the air craft; and speed controlling mechanism for said motor including a flexible power transmitting connection leading away from the camera.

2. The combination with an air craft of a spring motor driven camera adjustably mounted thereon with freedom to adjust itself to compensate for pitching or rolling movements of the air craft and speed regulating means for the camera motor including an adjustable part mounted on the camera, a manually adjustable device supported independently of the camera, and a flexible shaft extending between said part and said shaft.

3. In combination a support, a camera mounted thereon with freedom for adjustment and comprising a spring motor and an angularly adjustable speed regulating element for the motor, and operating means for said element comprising a worm, and a coöperating worm gear through which the rotation of the worm is transmitted to said element and a flexible shaft leading to the camera for rotating said worm.

NIELS PEDERSEN.